United States Patent
Goyal et al.

(10) Patent No.: US 11,774,259 B2
(45) Date of Patent: Oct. 3, 2023

(54) MAPPING OFF-ROAD ENTRIES FOR AUTONOMOUS VEHICLES

(71) Applicant: WAYMO LLC, Mountain View, CA (US)

(72) Inventors: Vishu Goyal, Sunnyvale, CA (US); Shubham Gupta, Sunnyvale, CA (US)

(73) Assignee: Waymo LLC, Mountain View, CA (US)

(*) Notice: Subject to any disclaimer, the term of this patent is extended or adjusted under 35 U.S.C. 154(b) by 224 days.

(21) Appl. No.: 17/469,253

(22) Filed: Sep. 8, 2021

(65) Prior Publication Data

US 2023/0074387 A1 Mar. 9, 2023

(51) Int. Cl.
| | |
|---|---|
| *G01C 21/36* | (2006.01) |
| *G01C 21/34* | (2006.01) |
| *G05D 1/00* | (2006.01) |
| *G06N 20/00* | (2019.01) |
| *G05D 1/02* | (2020.01) |
| *G06V 20/56* | (2022.01) |

(52) U.S. Cl.
CPC ..... *G01C 21/3658* (2013.01); *G01C 21/3453* (2013.01); *G05D 1/0088* (2013.01); *G05D 1/0212* (2013.01); *G06N 20/00* (2019.01); *G06V 20/588* (2022.01)

(58) Field of Classification Search
CPC ............ G01C 21/3658; G01C 21/3453; G01C 21/3407; G05D 1/0088; G05D 1/0212; G06N 20/00; G06V 20/588; B60W 60/00
See application file for complete search history.

(56) References Cited

U.S. PATENT DOCUMENTS

| | | | |
|---|---|---|---|
| 10,513,269 B2 | 12/2019 | Stein et al. | |
| 11,619,502 B2* | 4/2023 | Voznesensky | G05D 1/0274 701/26 |
| 2011/0023749 A1 | 2/2011 | Nakahama et al. | |
| 2018/0257660 A1 | 9/2018 | Ibrahim et al. | |
| 2019/0172349 A1* | 6/2019 | Vora | G01S 17/89 |
| 2021/0004017 A1 | 1/2021 | Colgate et al. | |

* cited by examiner

*Primary Examiner* — Anne Marie Antonucci
*Assistant Examiner* — Jewel Ashley Kuntz
(74) *Attorney, Agent, or Firm* — Botus Churchill IP Law LLP

(57) ABSTRACT

Aspects of the disclosure provide a method of identifying off-road entry lane waypoints. For instance, a polygon representative of a driveway or parking area may be identified from map information. A nearest lane may be identified based on the polygon. A plurality of lane waypoints may be identified. Each of the lane waypoints may correspond to a location within at least one lane. The polygon and the plurality of lane waypoints may be input into a model. A lane waypoint of the plurality of lane waypoints may be selected as an off-road entry lane waypoint. The off-road entry lane waypoint may be associated with the nearest lane. The association may be provided to an autonomous vehicle in order to allow the autonomous vehicle to use the association to control the autonomous vehicle in an autonomous driving mode.

20 Claims, 14 Drawing Sheets

MAPPING OFF-ROAD ENTRIES FOR AUTONOMOUS VEHICLES

BACKGROUND

Autonomous vehicles, for instance, vehicles that may not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings.

One detected, the autonomous vehicle's behavior modeling systems may attempt to predict what such other objects are going to do in the future. In some instances, vehicles may be leaving a roadway, for instance, to enter an off-road area such as a parking area or driveway. To improve the accuracy of such predictions, entry points for off road areas may be mapped. Typical approaches for mapping such entry points may involve using a plurality of heuristics related to the road, lane and driveway properties.

A heuristics-based approach may involve selecting points closest to a particular portion of a polygon representative of the driveway or parking area, such as the center of a closest edge of a polygon representative of the driveway or parking area, as an "off-road entry waypoint" for the polygon. For example, a lane may include a plurality of lane "waypoints" or rather points along the center of the lane. These waypoints may be sampled at fixed (e.g. every 1 meter or more or less) or variable distances. Each waypoint may have a "heading" corresponding to a direction of traffic flow of the lane in which the waypoint is located.

A heuristics-based approach may involve several steps in order to identify the vertices of the edge of the polygon and subsequently selecting the lane waypoint closest to the center of that edge. For instance, all waypoints near (e.g. within some predetermined distance of) a polygon may be considered. Each edge may be paired with its closest waypoint, so long as that the waypoint and the edge are visible to one another (e.g. not blocked by another edge of the polygon or some barrier in the roadway such as a median). The pairs may then be sorted by their distance, and the closest pair that has an angle distance (e.g. the difference in the heading of the lane waypoint and the orientation of the edge of the polygon) below some threshold may be selected. In such instances, pairs that intersect with one another may be preferred over others. The edge of the selected pair may be identified as an entry edge to the polygon (e.g. an entry to the driveway or parking area). The closest waypoint to a center of the entry edge may then be selected as the waypoint for the polygon. In this regard, an autonomous vehicle can expect other vehicles to pass through this waypoint when entering the driveway or parking area.

BRIEF SUMMARY

Aspects of the disclosure provide a method of identifying off-road entry lane waypoints. The method includes identifying, by one or more processors, from map information a polygon representative of a driveway or parking area; identifying, by the one or more processors, a nearest lane from the map information based on the polygon; identifying, by the one or more processors, a plurality of lane waypoints, each of the plurality of lane waypoints corresponding to a location within at least one lane; inputting, by the one or more processors, the polygon and the plurality of lane waypoints into a model; selecting, by the one or more processors, a lane waypoint of the plurality of lane waypoints as an off-road entry lane waypoint; associating, by the one or more processors, the off-road entry lane waypoint with the nearest lane; and providing, by the one or more processors, the association to an autonomous vehicle in order to allow the autonomous vehicle to use the association to control the autonomous vehicle in an autonomous driving mode.

In one example, each of the plurality of lane waypoints includes a heading and identifying the plurality of lane waypoints includes identifying waypoints having headings that align with a heading of the nearest lane. In another example, the model is a machine learned model. In another example, the method also includes using observations of actual road users entering a second polygon to identify a second lane waypoint; scoring the second lane waypoint; and training the model using the score. In this example, scoring the second lane waypoint is based on a number of observations having trajectories that pass through the second lane waypoint immediately before entering the second polygon. In addition or alternatively, training the model is further based on an angle difference between the heading of the second lane waypoint and a closest edge of a second polygon. In addition or alternatively, training the model is further based on a distance between the second lane waypoint and a center of the second polygon. In addition or alternatively, training the model is further based on a distance between the second lane waypoint and a center of the closest edge of the second polygon. In addition or alternatively, training the model is further based on a distance between the second lane waypoint and an end point of the closest edge of the second polygon. In this example, the end point is one of two end points of the closest edge of the second polygon that is closest to the second lane waypoint. In addition or alternatively, training the model is further based on an angle difference between the heading of the second lane waypoint and a heading of a line segment from the second lane waypoint to a center of the closest edge of the second polygon. In addition or alternatively, training the model is further based on a number of other lane waypoints that are closer to their respective closest edges of the second polygon. In addition or alternatively, training the model is further based on a number of other a number of other candidate lanes which are closer to their respective closest edges of the second polygon. In another example, the method also includes generating a virtual lane between the off-road entry lane waypoint and the associated nearest edge of the polygon. In this example, the method also includes providing the virtual lane to an autonomous vehicle in order to allow the autonomous vehicle to use the virtual to make a prediction about behavior of another road user. In another example, the method also includes identifying, by the one or more processors, a second nearest lane based on the polygon, the second nearest lane being an opposing lane of traffic to the nearest lane; identifying, by the one or more processors, a second plurality of lane waypoints; inputting, by the one or more processors, the polygon and the second plurality of lane waypoints into a second model; selecting, by the one or more processors, a lane waypoint of the plurality of lane waypoints as a second off-road entry lane waypoint; associating, by the one or more processors, the second off-road entry lane waypoint with the nearest lane as a second association; and providing, by the one or more processors, the second association to an autonomous vehicle in order to allow the autonomous vehicle to use the second association to control the autonomous vehicle in an autonomous driving mode.

Another aspect of the disclosure provides a system for identifying off-road entry lane waypoints. The system includes one or more processors configured to: identify from map information a polygon representative of a driveway or parking area; identify a nearest lane based on the polygon; identify a plurality of lane waypoints, each of the plurality of lane waypoints corresponding to a location within at least one lane; input, the polygon and the plurality of lane waypoints into a model; select a lane waypoint of the plurality of lane waypoints as an off-road entry lane waypoint; associate the off-road entry lane waypoint with the nearest lane; and provide the association to an autonomous vehicle in order to allow the autonomous vehicle to use the association to control the autonomous vehicle in an autonomous driving mode.

In one example, each of the plurality of lane waypoints includes a heading and identifying the plurality of laneway points includes identifying waypoints having headings that align with a heading of the nearest lane. In another example, the model is a machine learned model. In another example, the one or more processors are further configured to: using observations of actual road users entering a second polygon to identify a second lane waypoint; scoring the second lane waypoint; and training the model using the score.

DETAILED DESCRIPTION

Overview

Figure 1:
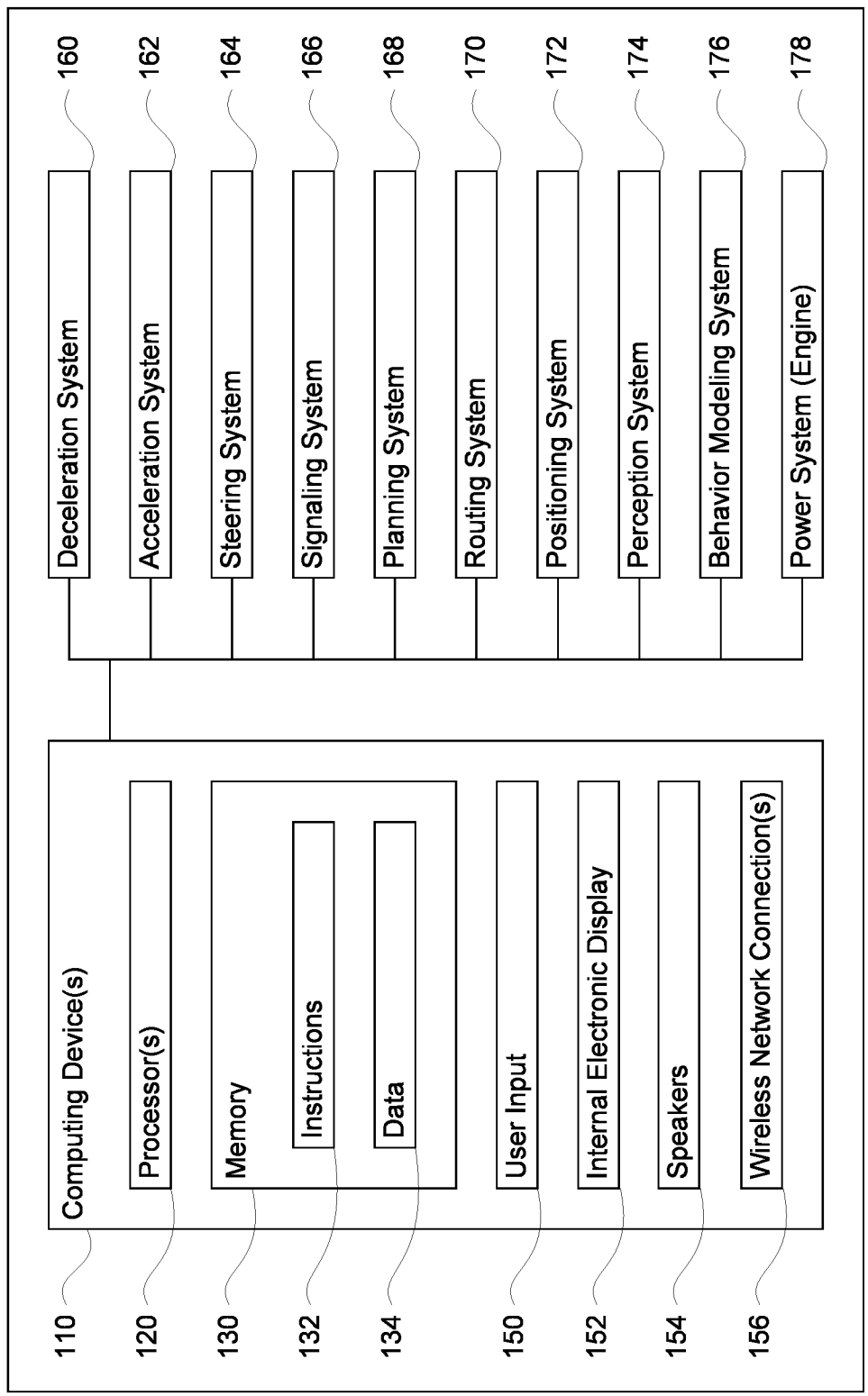
FIG. 1 is a functional diagram of an example vehicle in accordance with an exemplary embodiment.

The technology relates to enabling autonomous vehicles to make better behavior predictions for other vehicles which may be leaving a roadway, for instance, to enter an off-road area such as a parking area or driveway. For instance, by mapping entry points for off road areas, this may provide better context for predictions of what other vehicles are likely to do when near such entry points and/or off-road areas. Typical approaches for mapping such entry points may involve using a plurality of heuristics related to the road, lane and driveway properties. While the aforementioned heuristic-based approaches may work in many cases, they may not be accurate in all instances, especially if generalizing to other geographic areas. To address this, observations of actual vehicles entering the driveway or parking area may be used to select a lane waypoint for each driveway.

To do so, one or more server computing devices may iterate through driveway or parking area polygons in map information. For each polygon, one or more nearest lanes may be identified. For instance, the nearest lane in each traffic direction for a road adjacent to the polygon may be identified. In this regard, the nearest lanes may include the nearest lane from which road users are able to make a right into polygon and the nearest lane from which road users are able to make a left into a polygon. In addition, the edge of the polygon closest to each nearest lane may be identified.

For each nearest lane, a plurality of the aforementioned lane waypoints may be identified. This plurality may be filtered so that the lane waypoints have headings which align with the heading of the nearest lane. In this regard, the lane waypoints of the filtered plurality of lane waypoints may be in different lanes.

The filtered plurality of lane waypoints and the edge of the polygon as well as other features and characteristics may be input into a model which outputs a score for the lane waypoint. The model may be a machine learned model trained using scores generated from observations of actual road users entering driveways and parking areas. In some instances, different models may be used for lanes that are directly adjacent to the polygon (e.g. traffic from the lane is able to make a right into a parking area) and lanes that are not directly adjacent to the polygon (e.g. traffic from the lane is able to make a left into the parking area).

For instance, logs including such observations may be used to generate frequency maps for particular polygons representing driveways or parking areas with greater numbers of observations. Each of these observations may include a lane waypoint for a nearest lane that was used by the road user to enter the polygon. Once the frequencies of trajectories entering a polygon are computed, the lane waypoint with the highest number of trajectories is labeled with the highest score. Other lane waypoints with fewer trajectories may be considered less relevant and may be given lower scores. The resulting scores may be used as training outputs for the model. Training inputs for the model may include information such as map information including the polygon, adjacent lanes as well as nearby lane waypoints.

The lane waypoint with the highest may be selected as the off-road entry waypoint for the polygon. For instance, the off-road entry waypoint may be associated with the nearest edge of the polygon. Such associations may be incorporated into map information used by autonomous vehicles. In this regard, the association may be downloaded, transmitted, or otherwise sent to one or more vehicles of a fleet of autonomous vehicles. These autonomous vehicles may use the associations to control the autonomous vehicle as well as to make behavior predictions about other road users.

The features described herein may allow autonomous vehicles to make better behavior predictions for other vehicles which may be leaving a roadway, for instance, to enter an off-road area such as a parking area or driveway. For instance, by mapping entry points for off road areas, this may provide better context for predictions of what other vehicles are likely to do when near such entry points. This can result in more well-informed diving decisions and an increase in the overall safety of these autonomous vehicles.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g. garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices 410 discussed below or other computing devices), pullover spots, vegetation, or other such objects and information.

Figure 2A:
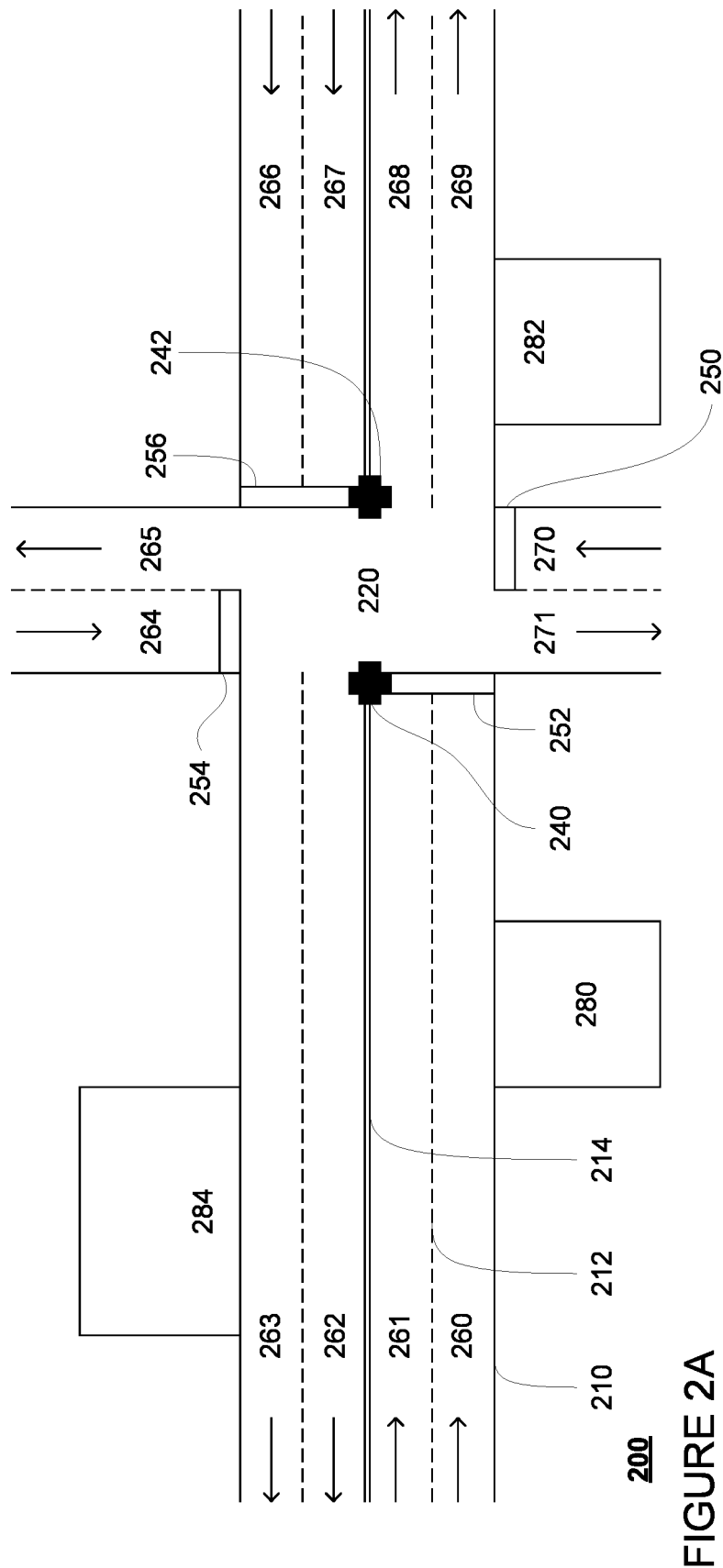
FIGS. 2A-B are an example of map information in accordance with aspects of the disclosure.
Figure 2B:
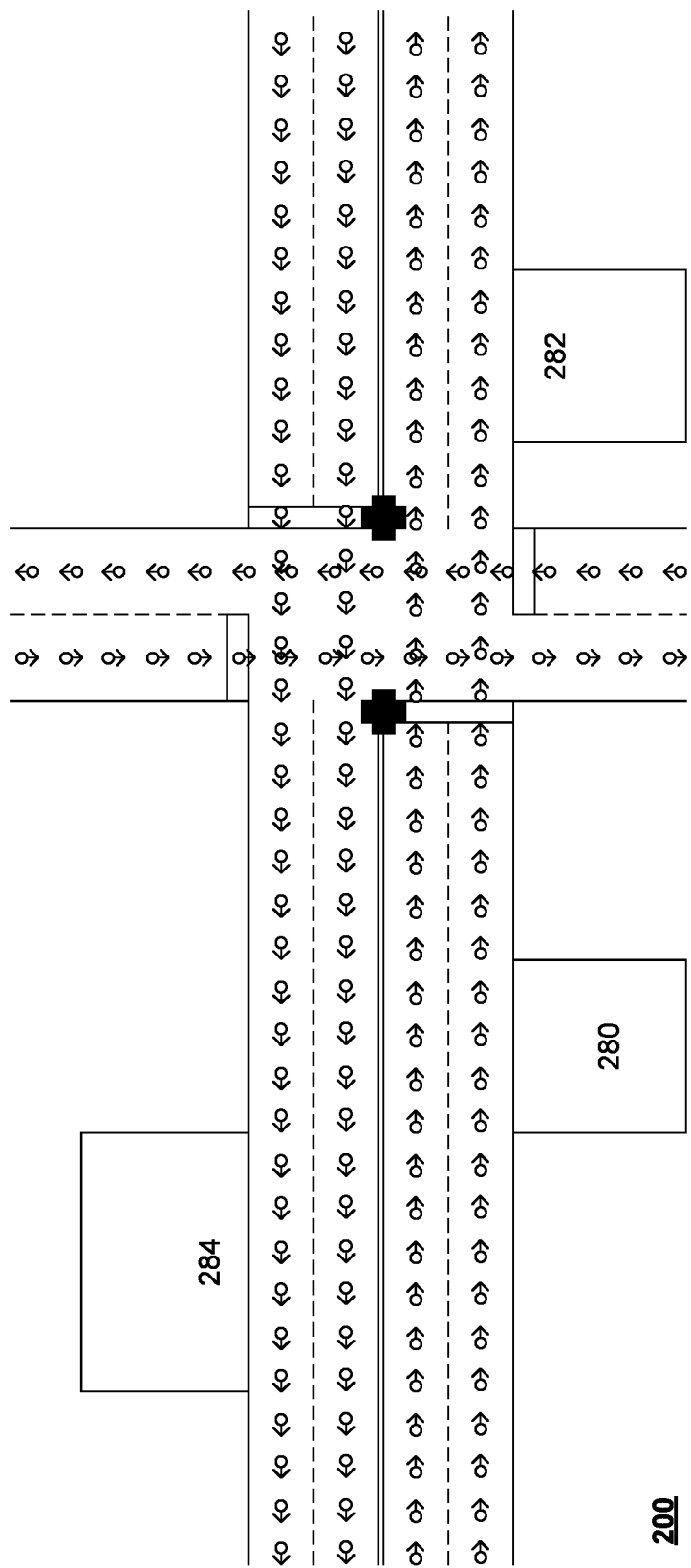

FIGS. 2A-B are an example of map information for a section of roadway corresponding to a service area for autonomous vehicles such as autonomous vehicle 100. FIGS. 2A-B is an example of map information 200 for a section of roadway including intersection 220. FIG. 2A depicts a portion of the map information that includes information identifying the shape, location, and other characteristics of lane markers or lane lines 210, 212, 214, traffic signals 240, 242, as well as stop lines 250, 252, 254, 256 arranged around the intersection 220. The lane lines may also define various lanes 260-271 or these lanes may also be explicitly identified in the map information 200. In addition to these features, the map information may also include information that identifies the direction of traffic, as suggested by the respective arrows depicted in each of lanes 260-271. In this regard, lanes 260, 261 are opposing lanes of traffic to lanes 262, 263, respectively, and so on. The map information may also include speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

In addition, the map information may identify driveways and parking areas. For example, a driveway or parking area may be identified by a geolocated polygon marking out the boundaries of the driveway or parking area such as polygons 280, 282, 284. Each vertex of the polygons 280, 282, 284 may be associated with a two or three-dimensional location (e.g. latitude, longitude, altitude). Driveway and parking area boundaries may be identified, for example, by human labelers or by using such labeled data to train machine learning models to identify polygons for driveways using input map information. In some instances, the polygon may not actually correspond to an entire driveway or parking area, but rather may actually identify only a portion of the driveway or parking area adjacent to a road. This may be due to the dimensions of the driveway or parking area and the quality of the information available to map the driveway (e.g. longer driveways are less likely to be fully mapped than shorter driveways).

The map information may be configured as a roadgraph. The roadgraph may include a plurality of graph nodes and edges representing features such as crosswalks, traffic lights, road signs, road or lane segments, etc. that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow).

The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

In addition to or as an alternative to the aforementioned nodes, the map information may include a plurality of lane waypoints along each lane. For example, a lane may include a plurality of lane "waypoints" or rather two- or three-dimensional points arranged along the center of the lane. These waypoints may be sampled at fixed (e.g. every 1 meter or more or less) or variable distances. Each waypoint may have a "heading" corresponding to a direction of traffic flow of the lane in which the waypoint is located. For instance, FIG. 2B depicts a plurality of such lane waypoints (depicted as open circles), each with an arrow identifying a heading of the lane waypoint. Although only a few lane waypoints are depicted for simplicity, the number of lane waypoints may be significantly more or less than that depicted.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3:
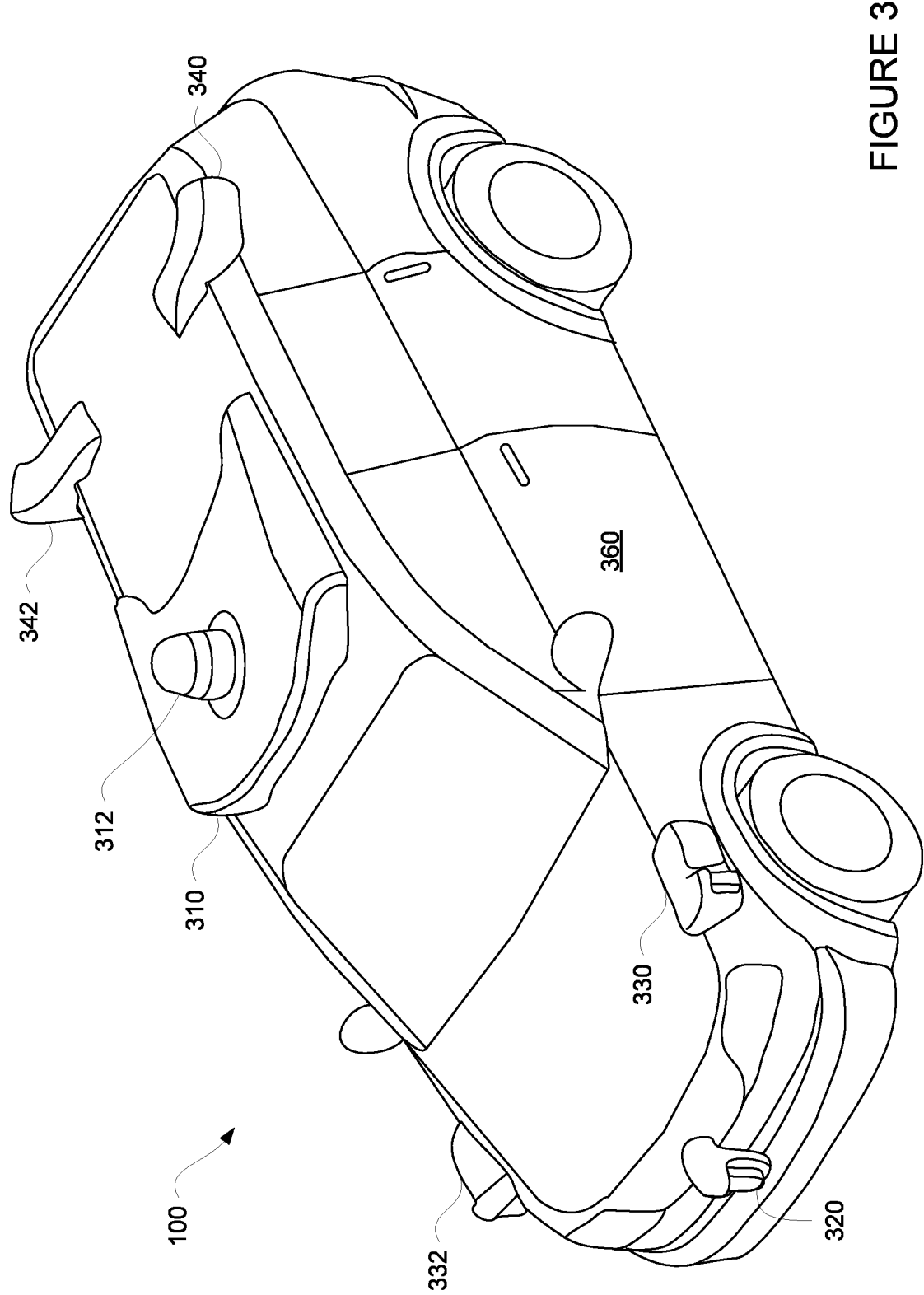
FIG. 3 is an example external view of a vehicle in accordance with aspects of the disclosure.

For instance, FIG. 3 is an example external view of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320 located at the front end of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes housings 340, 342 for radar units and/or cameras also located on the roof of autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output one or more predicted future behaviors for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, direction, etc. to allow the vehicle to follow the route towards reaching a destination. A control system software module of computing devices 110 may be configured to control movement of the vehicle, for instance by controlling braking, acceleration and steering of the vehicle, in order to follow a trajectory.

The Computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
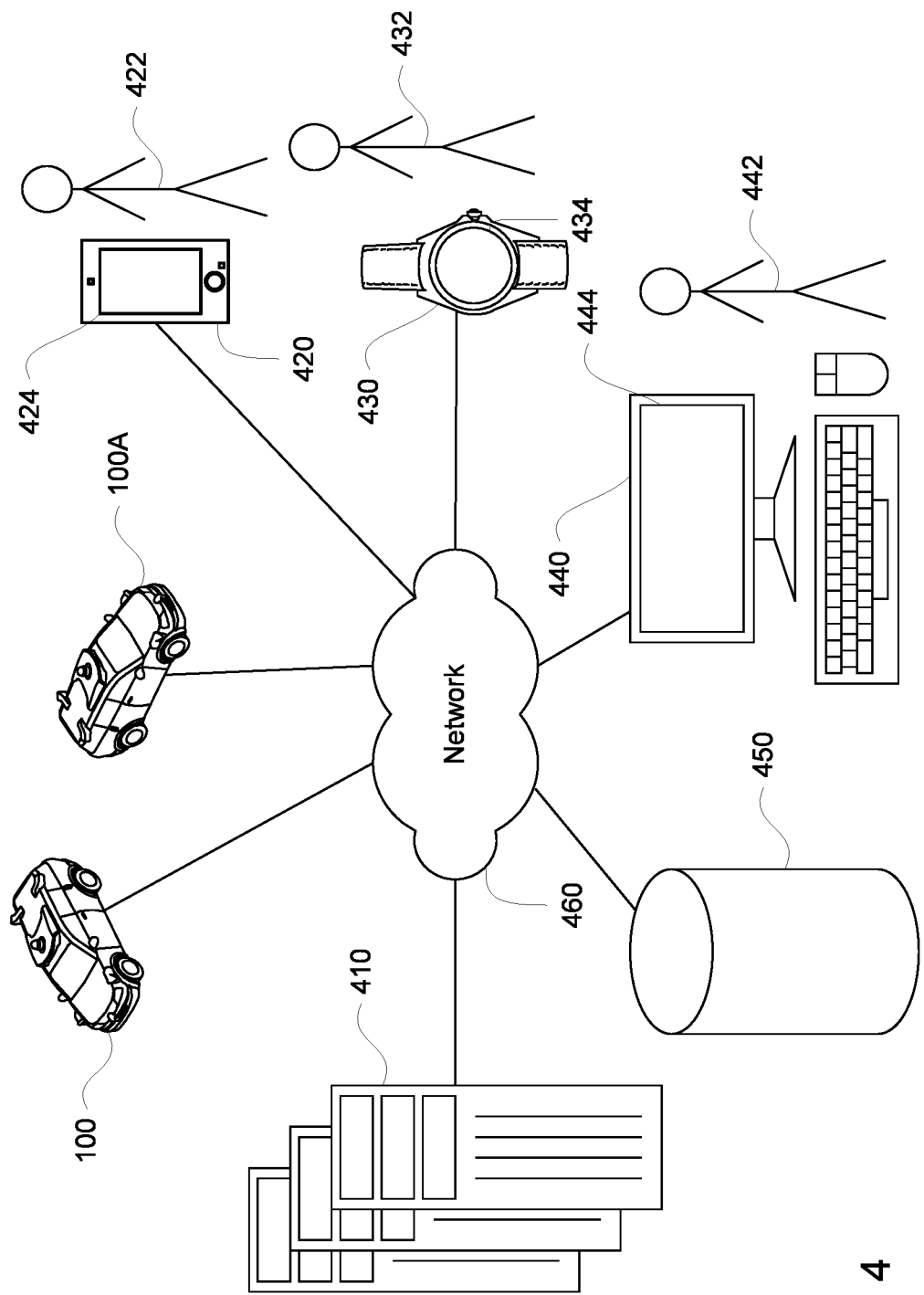
FIG. 4 is a pictorial diagram of an example system in accordance with aspects of the disclosure.
Figure 5:
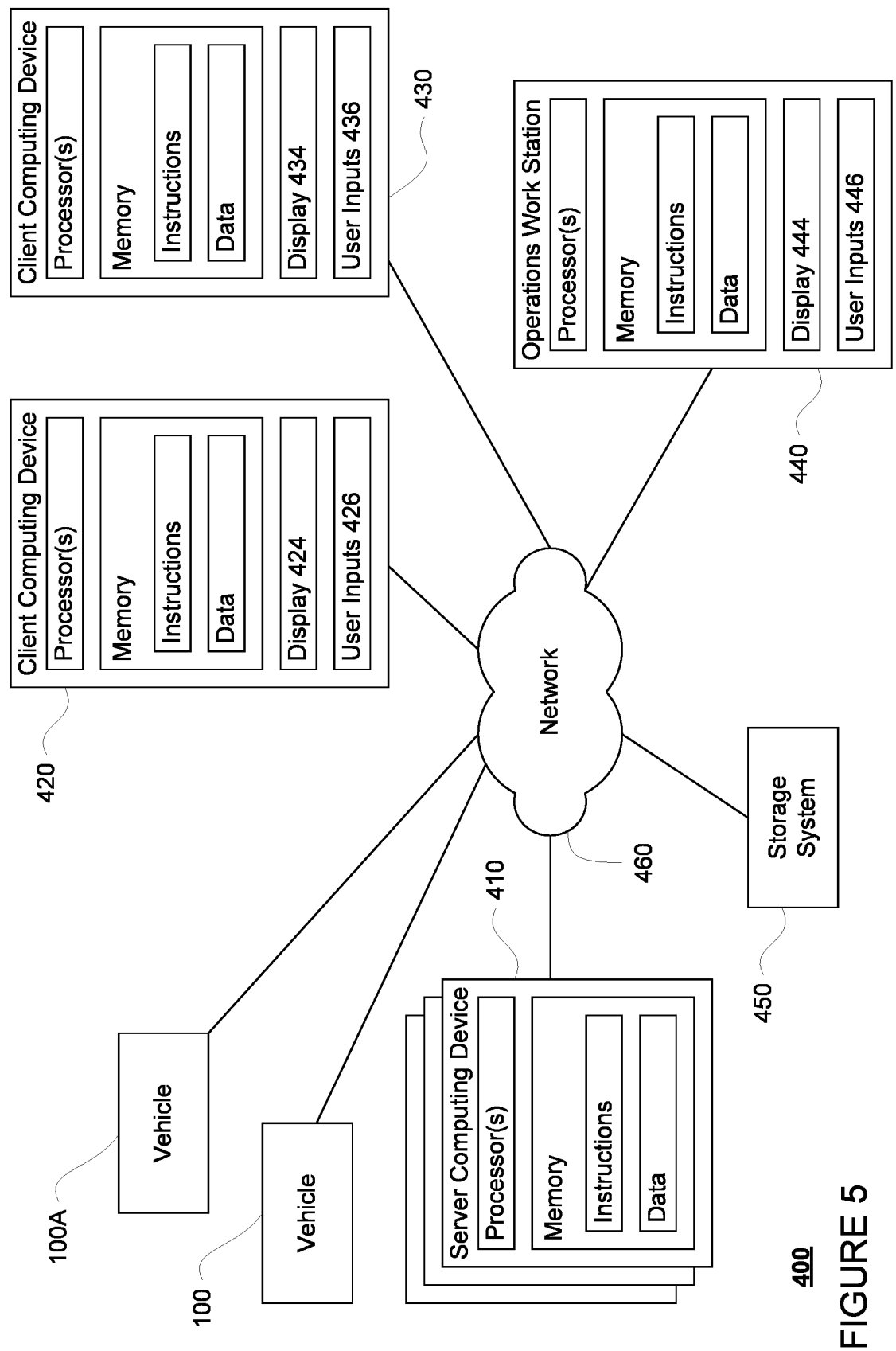
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the server computing devices 410 may function as a scheduling system which can be used to arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 3, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

Each of the client computing devices may be a remote computing device used by a person (e.g. human operators or users 422, 432, 442) to review and analyze sensor data and other information generated by a perception system of a vehicle such as perception system 174 of autonomous vehicle 100. Although only a few remote computing devices are shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For example, the storage system 450 may store map information which may be the same or similar to the map information described above as well as model data, such as machine learned models and model parameters generated as a result of the training discussed below.

In addition, the storage system 450 may store log data. This log data may include data generated by the various systems of a vehicle, such as autonomous vehicle 100, while the vehicle is being operated in a manual driving mode or an autonomous driving mode. For instance, the log data may include sensor data generated by a perception system, such as perception system 174 of autonomous vehicle 100. As an example, the sensor data may include raw sensor data as well as labels identifying defining characteristics of perceived objects such as shape, location, orientation, speed, etc. of objects such as vehicles, pedestrians, bicyclists, vegetation, curbs, lane lines, sidewalks, crosswalks, buildings, etc. The labels themselves may be generated and applied by an autonomous vehicle's perception system, such as perception system 174 of autonomous vehicle 100, for instance, using machine learned models trained on human labeled data. Alternatively, if the simulation is based on simulated log data generated in part by human operators, the label identifying an open door may be applied by a human operator.

The log data may store observed information or observations of other road users such as other vehicles, pedestrians, bicyclists, etc. The observations may include information such as trajectories. The trajectories may be a list of positions and orientations or headings (e.g. poses). In some instances, a pose may be associated with a lane waypoint, for example, if the orientation or heading aligns with the lane waypoint and is within some predetermined distance of that lane waypoint (e.g. a few centimeters or more or less).

The log data may also include "event" data identifying different types of events for the autonomous vehicle such as collisions or near collisions with other objects, planned trajectories describing a planned geometry and/or speed for a potential path of the vehicle, actual locations of the vehicle at different times, actual orientations/headings of the vehicle at different times, actual speeds, accelerations and decelerations of the vehicle at different times, classifications of and responses to perceived objects, behavior predictions of perceived objects, status of various systems (such as acceleration, deceleration, perception, steering, signaling, routing, planning, power, etc.) of the vehicle at different times including logged errors, inputs to and outputs of the various systems of the vehicle at different times, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
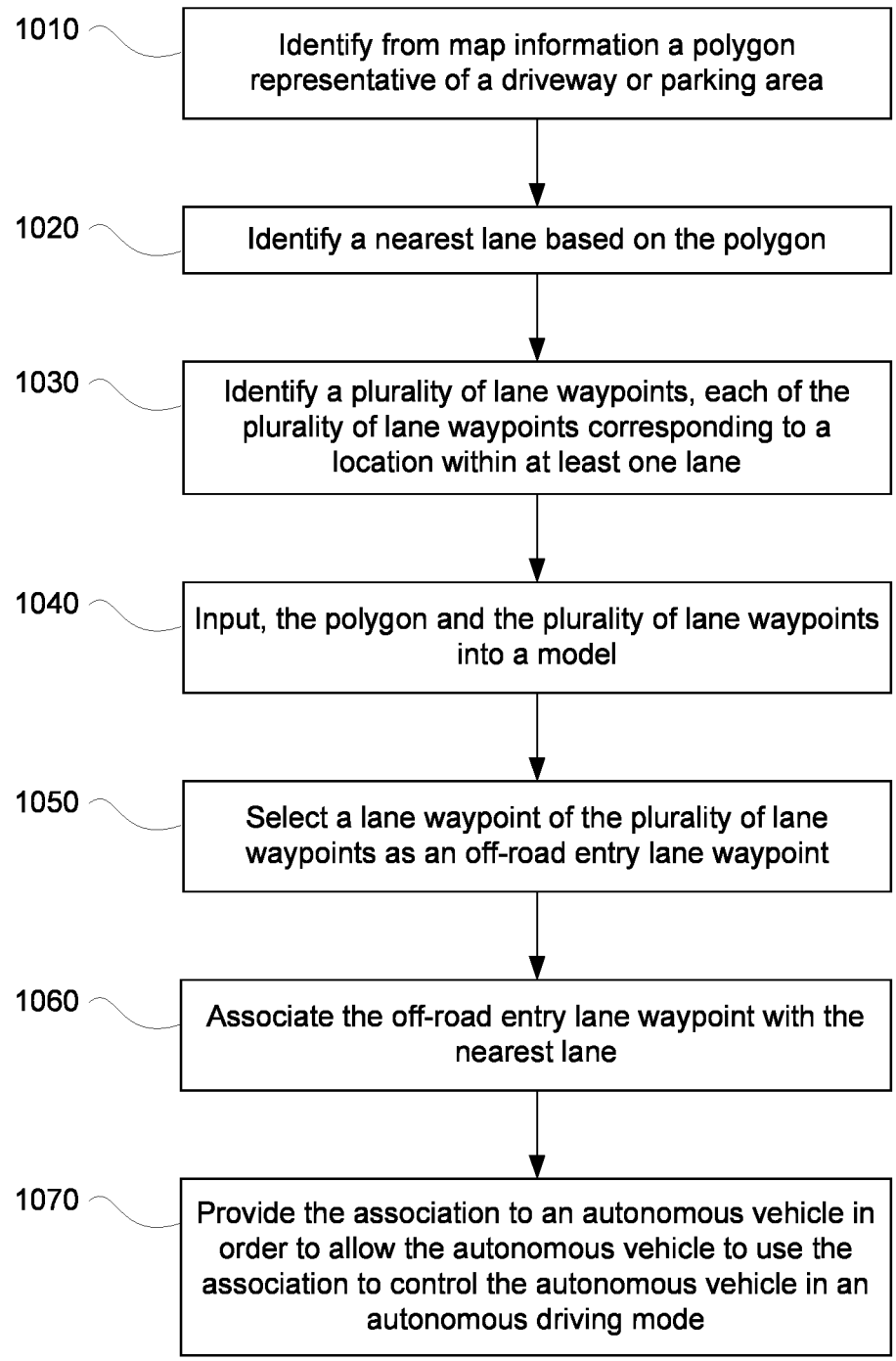
FIG. 10 is an example flow diagram in accordance with aspects of the disclosure.

FIG. 10 is an example flow diagram 1000 for identifying off-road entry lane waypoints. For instance at block 1010, a polygon representative of a driveway or parking area is identified from map information. At block 1020, a nearest lane is identified from the map information based on the polygon.

Figure 6:
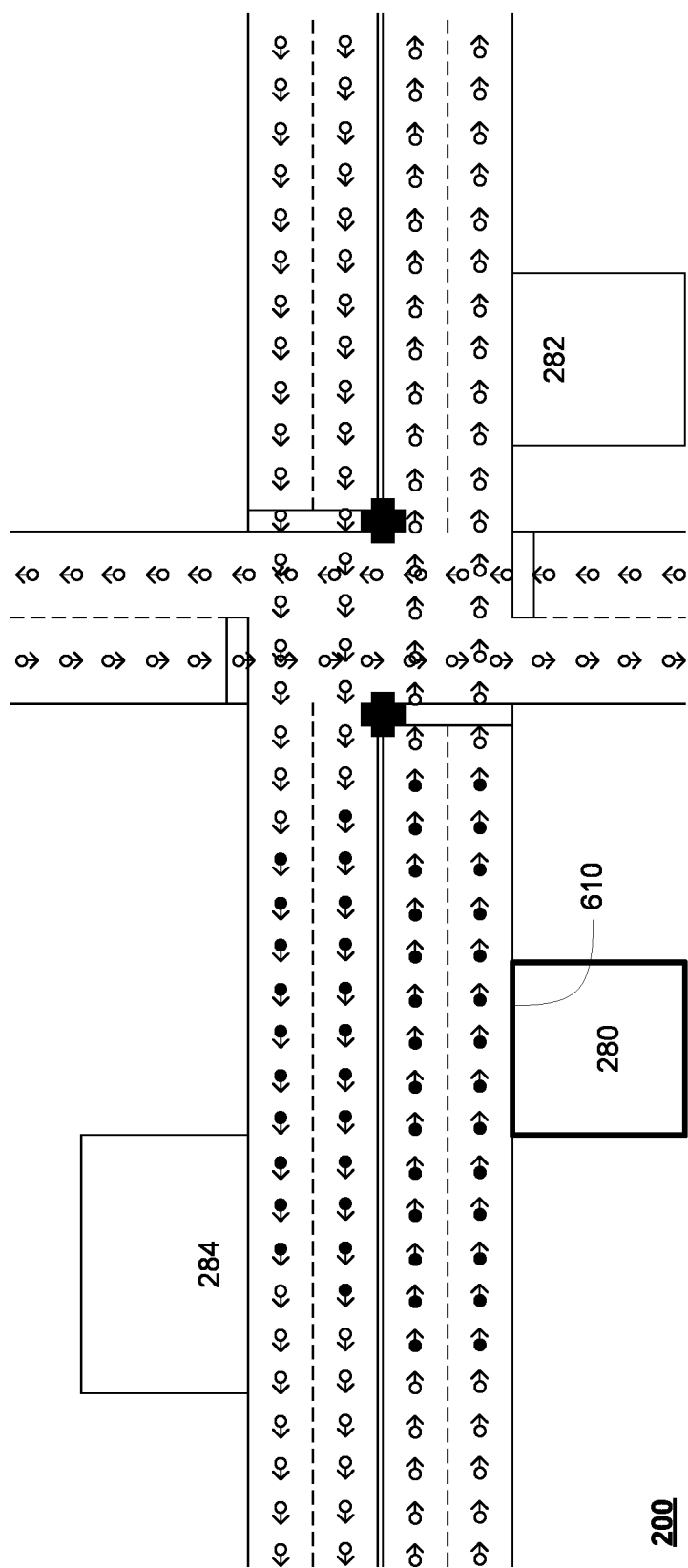
FIG. 6 is an example of map information in accordance with aspects of the disclosure.

To do so, one or more server computing devices, such as the server computing devices 410, may iterate through driveway or parking area polygons in map information. As noted above, this map information may be stored in the storage system 450 and accessed by the server computing devices. For instance, returning to FIG. 2A, the server computing devices may select one of the polygons 280, 282, 284. In this regard, the server computing devices 410 may iterate through all of the polygons in the map information (e.g. first polygon 280, next polygon 282, and so on). In the example of FIG. 6, the server computing devices 410 have selected polygon 280 (depicted in bolded line).

For each polygon, one or more nearest lanes may be identified from the map information by the server computing devices. For instance, the nearest lane in each traffic direction for a road adjacent to the polygon may be identified. In this regard, the nearest lanes may include the nearest lane from which road users are able to make a right into polygon and the nearest lane from which road users are able to make a left into a polygon. In addition, the edge of the polygon closest to each nearest lane may be identified. Returning to the example of FIG. 2, the nearest lane to the polygon 280 in each traffic direction may be lane 260 and lane 262. In this regard, a vehicle traveling in lane 260 would make a right into the driveway or parking area represented by polygon 280 from the lane 260, whereas a vehicle traveling in lane 262 would make a left turn into the driveway or parking area represented by polygon 280 from the lane 262.

Returning to FIG. 10, at block 1030, a plurality of lane waypoints is identified. Each of the plurality of lane waypoints corresponding to a location within at least one lane. For each nearest lane, a plurality of the aforementioned lane waypoints may be identified by the server computing devices. For instance, the closest 50 or more or less lane waypoints to the nearest edge may be identified, for instance as described in the example above related to using heuristics. In some instances, the lane waypoints of the filtered plurality of lane waypoints may be in different lanes. For example, turning to FIG. 6, the server computing devices 410 have selected 50 lane way waypoints (depicted as solid circles) closest to the nearest edge 610 of the polygon 280.

Figure 7A:
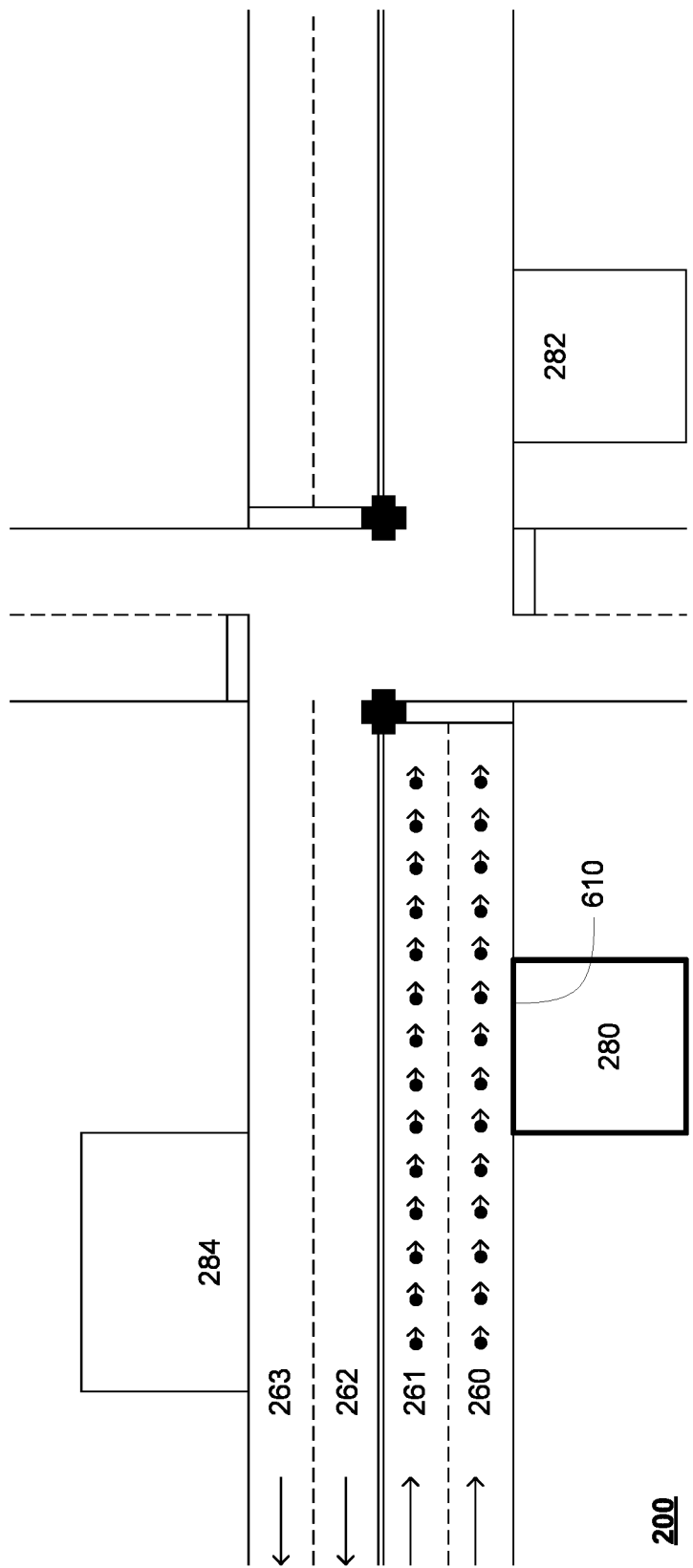
FIG. 7A-B are examples of map information and log data in accordance with aspects of the disclosure.
Figure 7B:
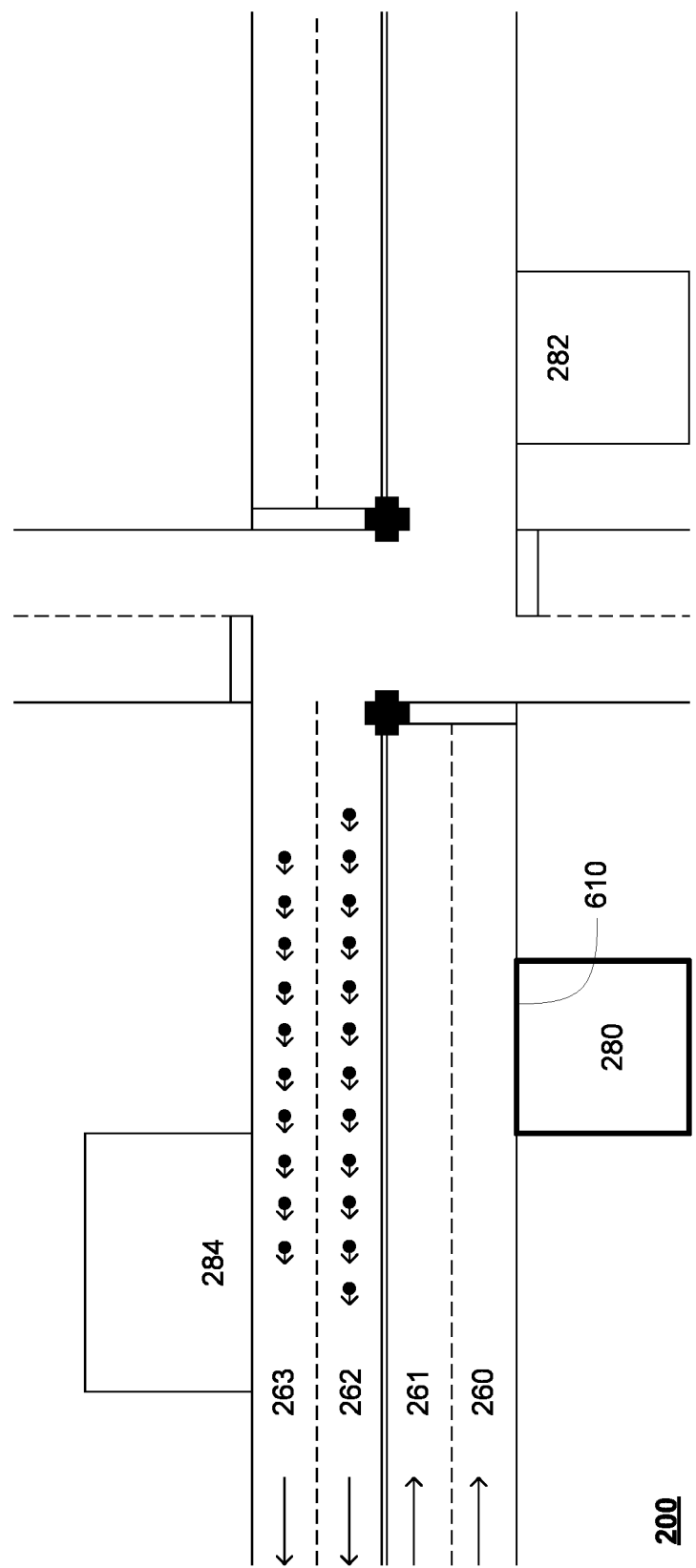

Thereafter, the plurality may be filtered so that the lane waypoints have headings which align or are within a predetermined angular distance (e.g. within 18 degrees or more or less) with the heading of the nearest lane. In addition, other lane waypoints may be filtered if there is a barrier, such as a median, between the lane waypoint and the polygon. In this regard, the process may be repeated for the different nearest lanes 260, 262. For instance, as depicted in FIG. 7A, the lane waypoints for lane 260 may be filtered such that only the lane waypoints in lane 260 and 261 are left as these have headings consistent with lane 260. Similarly, as depicted in FIG. 7A, the lane waypoints for lane 262 may be filtered such that only the lane waypoints in lanes 262 and 263 are left as these have headings consistent with lane 260.

Returning to FIG. 10, at block 1040, the polygon and the plurality of lane waypoints are input into a model. For instance, the filtered plurality of lane waypoints and the edge of the polygon as well as other features and characteristics may be input into a model by the server computing devices. The model may then output a score for the lane waypoint.

The model may be a machine-learned model stored in the storage system 450 trained using scores generated from observations of actual road users entering driveways and parking areas. In some instances, different models may be used for lanes that are directly adjacent to the polygon (e.g. traffic from the lane is able to make a right into a parking area such as lane 260 for polygon 280) and lanes that are not directly adjacent to the polygon (e.g. traffic from the lane is able to make a left into the parking area such as lane 262 for polygon 280).

Figure 8A:
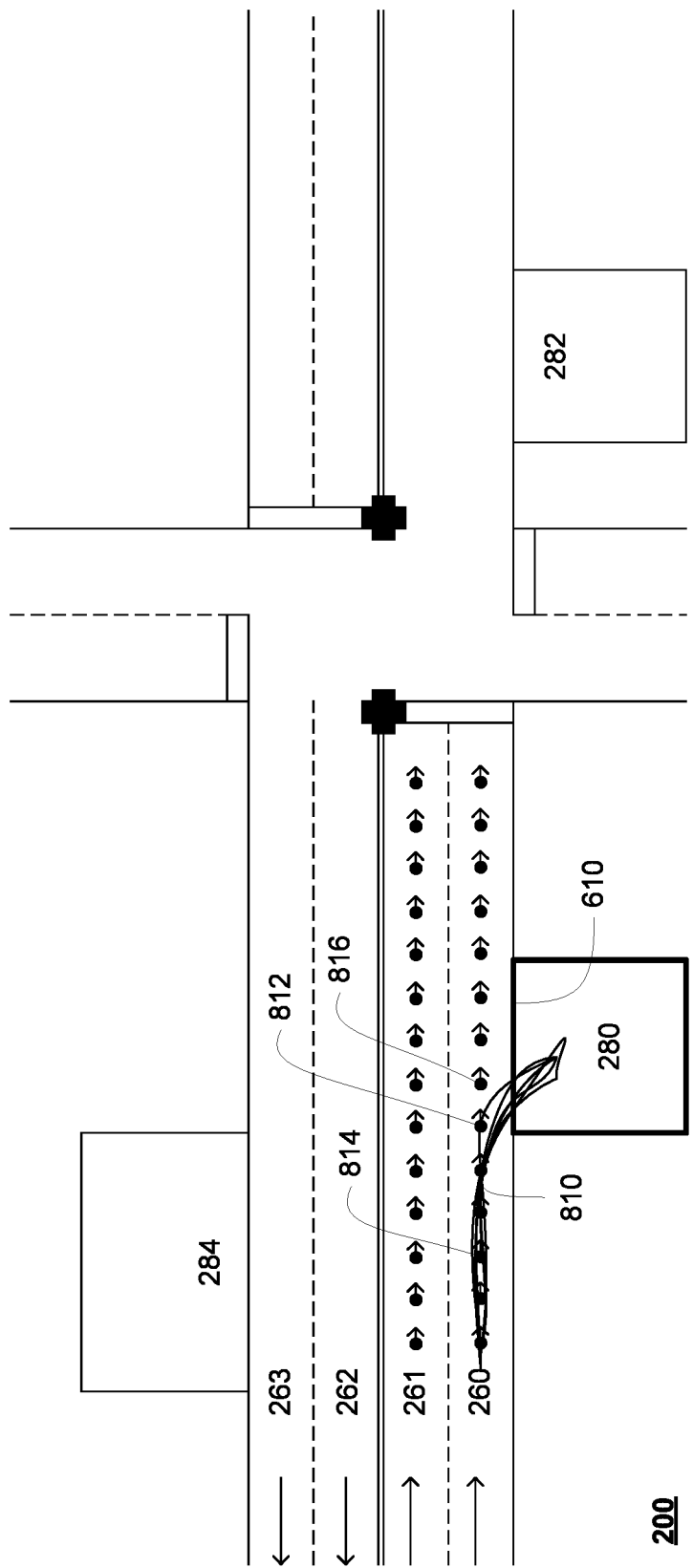
FIG. 8A-B are examples of map information and scores in accordance with aspects of the disclosure.
Figure 8B:
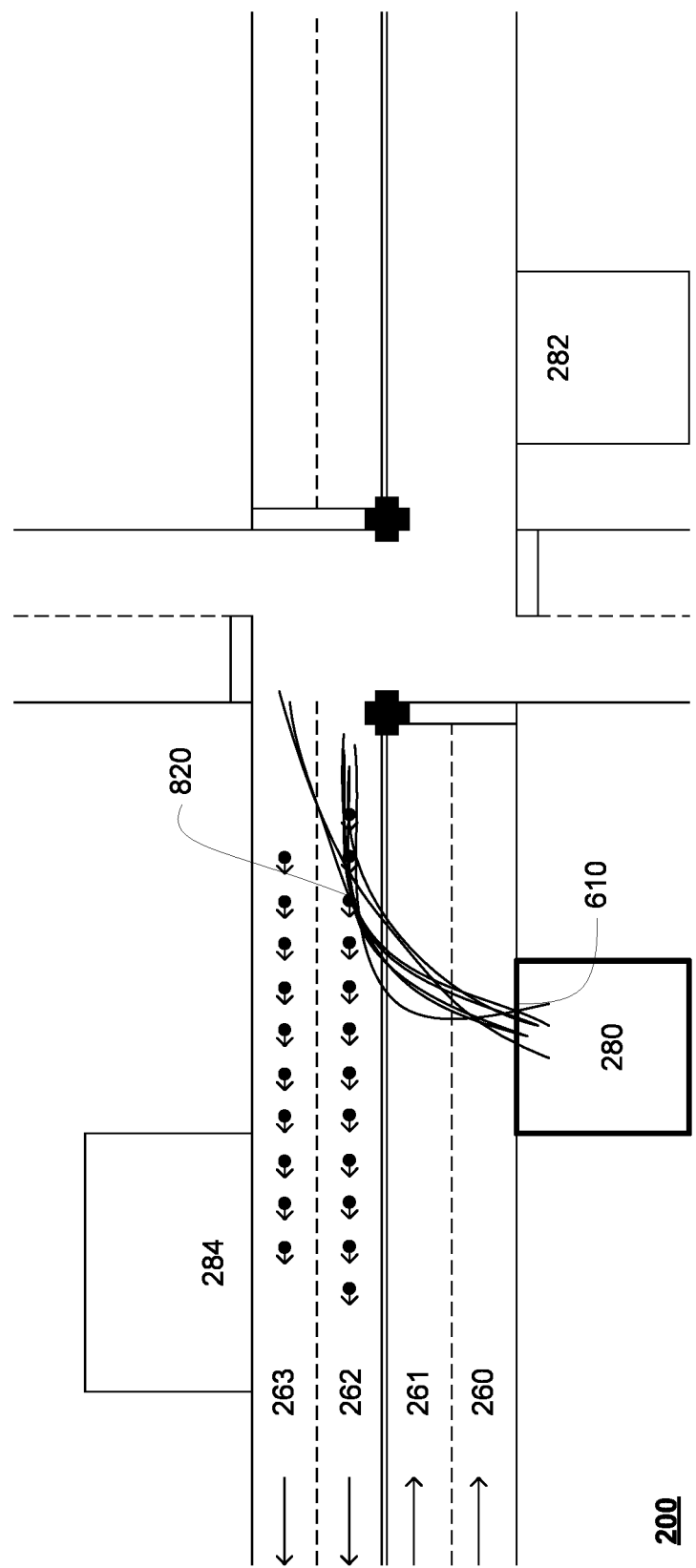

For instance, log data, stored in the storage system 450, which includes such observations may be used by the server computing devices 410 to generate frequency maps for particular polygons representing driveways or parking areas. Each of these observations may include a lane waypoint for a nearest lane that was used by the road user to enter the polygon. For instance, FIG. 7A represents observations for the polygon 280 and the aforementioned lane waypoints identified for lane 260. Each observation is represented by a line corresponding to a trajectory of a road user (e.g. a vehicle) that entered into the driveway or parking area represented by polygon 280 and passed through one of the lane waypoints identified for lane 260 immediately before entering the driveway or parking area represented by polygon 280. FIG. 8B represents observations for the polygon 280 and the aforementioned lane waypoints identified for lane 262. Again, each observation is represented in the FIGURE by a line corresponding to a trajectory of a vehicle that entered into the driveway or parking area represented by polygon 280 and passed through one of the lane waypoints identified for lane 262 immediately before entering the driveway or parking area represented by polygon 280.

Once the frequencies of trajectories entering a polygon are computed by the server computing devices 410, the lane waypoint with the highest number of trajectories, or rather, the highest frequency of use by road users immediately before entering the driveway or parking area represented by the polygon, is labeled with the highest score (or lowest score depending upon how the scoring is arranged). For instance, the lane waypoint 810 of FIG. 8A may be assigned the highest score for the lane waypoints of lane 260 (e.g. a score of 5 as 5 of the depicted observations use lane waypoint 810 immediately before entering the driveway or parking area represented by polygon 280). In this example, even though many observations also pass-through lane waypoint 816, they do not do so immediately before entering the driveway or parking area represented by polygon 280. Rather, these observations also pass through one or more additional lane waypoints (including lane waypoint 810) before entering the driveway or parking area represented by polygon 280. In the same regard, the lane waypoint 820 of FIG. 8B may be assigned the highest score for the lane waypoints of lane 262.

Other lane waypoints with fewer trajectories, or rather, with lower frequencies of use by road users immediately before entering the driveway or parking area represented by the polygon) may be considered less relevant or not relevant at all if there are no trajectories and may be given lower scores (again, or higher scores depending upon how the scoring is arranged). For instance, returning to the example of FIG. 8A, lane waypoint 812 may be associated with a lower score than lane waypoint 810 (e.g. a score of 1), and lane waypoints 814, 816 may be assigned even lower scores (e.g. a score of 0). The resulting scores may be used as training outputs for the model.

Training inputs for the one or more models may include information such as map information including the polygon, adjacent lanes as well as nearby lane waypoints. Other training inputs may include:

- the absolute angle difference between the heading of the lane waypoint and the direction of the closest edge of the polygon;
- the L2 (e.g. Euclidean) distance between the lane waypoint and the center of the polygon;
- the L2 distance between the lane waypoint and its closest edge of the polygon;
- the L2 distance between lane waypoint and center of the closest edge of the polygon;
- the absolute (e.g. not signed) lateral distance between the lane waypoint and the closest edge of the polygon (e.g. measured perpendicularly to the closest edge of the polygon);
- the signed (e.g. negative or positive) lateral distance between the lane waypoint and the closest edge of the polygon (e.g. measured perpendicularly to the closest edge of the polygon);
- absolute longitudinal distance between the lane waypoint and center of its closest edge of the polygon (e.g. measured in a direction oriented in the same direction as the closest edge of the polygon);
- the signed longitudinal distance between the lane waypoint and center of its closest edge of the polygon (e.g. measured in a direction oriented in the same direction as the closest edge of the polygon);
- absolute longitudinal distance between the lane waypoint and an end point of the closest edge of the polygon (in this example, between the two end points of the closest edge, the end point that is closest to the lane waypoint may be used)(e.g. measured in a direction oriented in the same direction as the closest edge of the polygon);
- the signed longitudinal distance between the lane waypoint an end point of the closest edge of the polygon (in this example, between the two end points of the closest edge, the end point that is closest to the lane waypoint is used) (e.g. measured in a direction oriented in the same direction as the closest edge of the polygon);
- the absolute angle difference between the heading of the lane waypoint and the orientation of a line segment drawn from lane waypoint to the center of the closest edge of the polygon;
- the number of other lane waypoints in the filtered set of lane waypoints which are closer to their respective closest edges of the polygon; and
- a number of other candidate lanes which are closer to their respective closest edges of the polygon. In this instance, candidate lanes may refer to the lanes having lane waypoints in the filtered set of lane waypoints.

Returning to FIG. 10, at block 1050, a lane waypoint of the plurality of lane waypoints is selected as an off-road entry lane waypoint. Thereafter at block 1060, the off-road entry lane waypoint is associated with the nearest lane. The lane waypoint with the highest (or lowest score) may be selected by the server computing devices 410 as the off-road entry waypoint for the polygon. For instance, the server computing devices 410 may associated the selected off-road entry waypoint with the polygon and/or the nearest edge of the polygon and store this information in the storage system 450, for instance, with the map information. In this regard, if there are multiple nearest lanes, a single edge may be associated with different off-road entry waypoints for different directions of traffic (e.g. two off-road entry waypoints may be associated with the same edge; one for each direction of traffic). Moreover, different edges of the same polygon may be associated with different off-road entry waypoints (e.g. at different entrances to the same parking area or driveway).

Returning to FIG. 10, at block 1070, the association is provided to an autonomous vehicle in order to allow the autonomous vehicle to use the association to control the autonomous vehicle in an autonomous driving mode. For instance, the server computing devices 410 may provide the association to the various autonomous vehicles of the fleet, such as autonomous vehicles 100, 100A, 100B. In addition associations may be incorporated into map information used by those autonomous vehicles. In this regard, the association may be downloaded, transmitted (e.g. by the server computing devices 410 via a network such as network 460), or otherwise sent to one or more vehicles of a fleet of autonomous vehicles. These autonomous vehicles may use the associations to control the autonomous vehicle as well as to make behavior predictions about other road users.

Although the features herein are described in relation to a fully autonomous driving mode, all or some aspects of the disclosure may be used in conjunction with partially autonomous driving modes and/or manual driving models. For instance, the aforementioned behavior predictions may be used to provide driver assistance by controlling the vehicle to avoid a collision or other situation and/or to signal a driver or other person in the vehicle to various information such as by visual or audible notifications provided via a display or speakers of the autonomous vehicle 100.

For example, when another road user approaches the location an off-road entry waypoint while slowing down (with or without a turn signal in the direction of a polygon in the map information corresponding to a driveway or parking area), this may be used by the autonomous vehicle's computing devices to predict that the other road user may exit the road at the off-road entry waypoint.

Figure 9A:
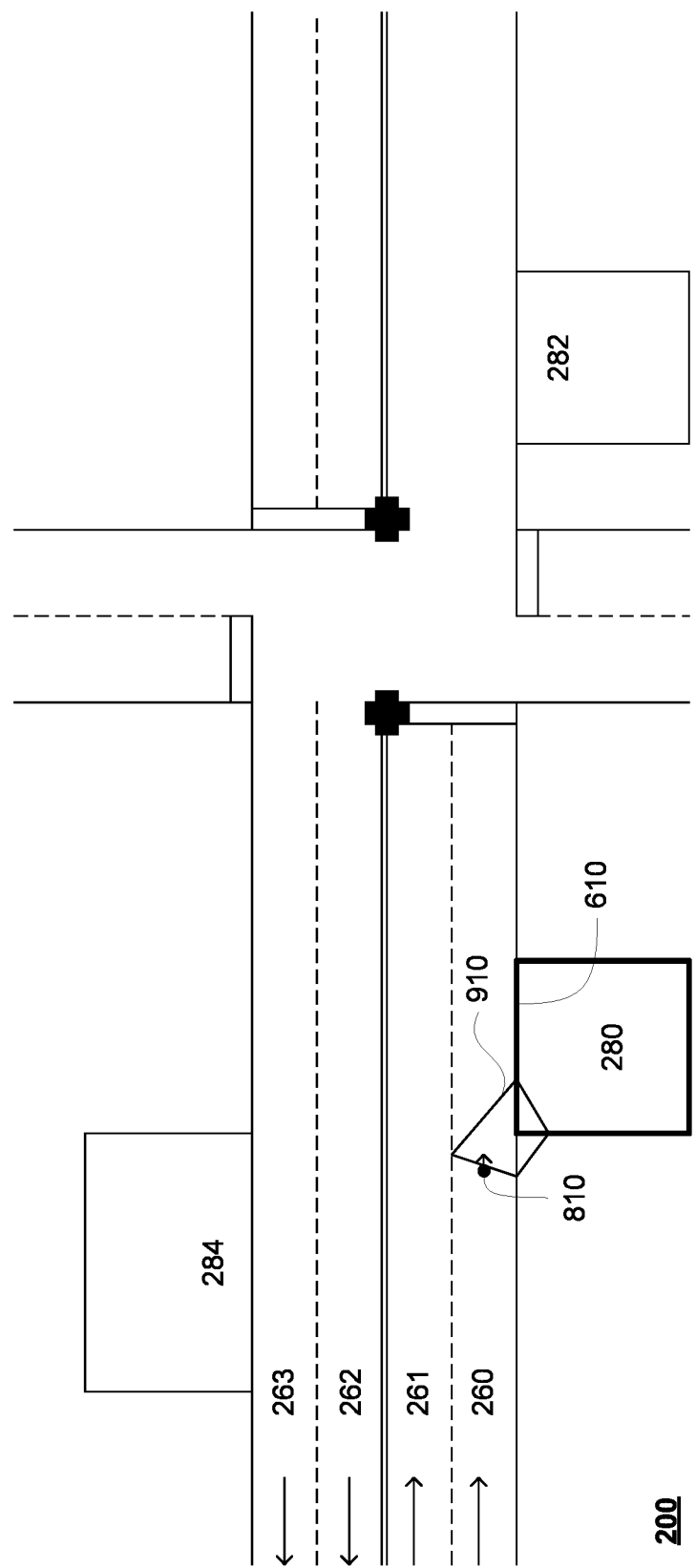
FIGS. 9A-B are examples of map information and a virtual lane in accordance with aspects of the disclosure.
Figure 9B:
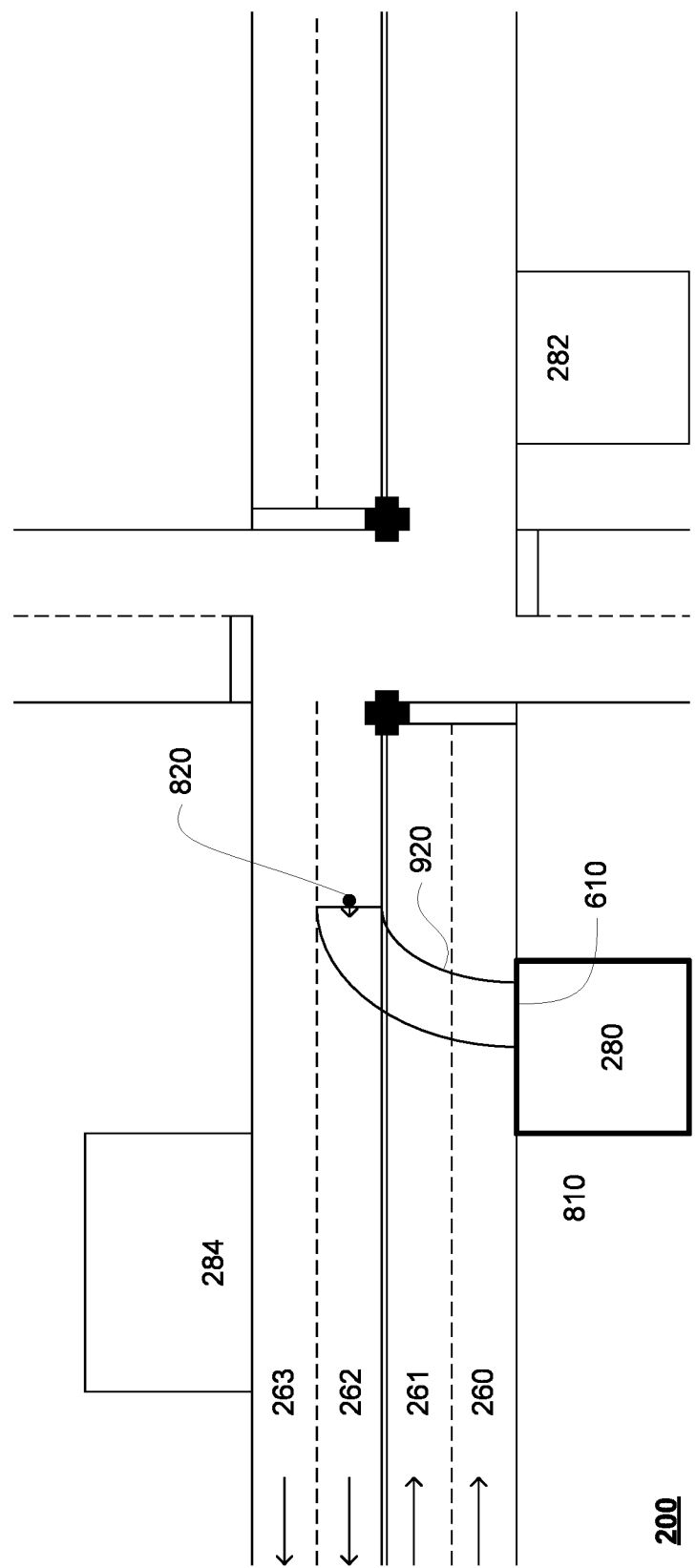

In some instances, for each off-road entry lane waypoint, a virtual lane may be generated by the server computing devices 410 between the off-road entry lane waypoint and the associated nearest edge of the polygon and incorporated into the map information. For instance, turning to FIG. 9A, as lane waypoint 810 is associated with the polygon 280, a virtual lane 910 may be drawn. Similarly, turning to FIG. 9A, as lane waypoint 820 is associated with the polygon 280, a virtual lane 920 may be drawn. Again this additional map information may also be provided to the aforementioned autonomous vehicles as described above. This additional map information may also be used by the autonomous vehicle's computing devices to more accurately predict a trajectory that the other road user may exit the road at the off-road entry waypoint. In some instances, this additional map information can be computed by the computing devices of an autonomous vehicle, such as computing device 110 of the autonomous vehicle 100, in real time.

Similar approaches could be used by the server computing devices 410 to train and use models for mapping off-road exit lane waypoints or waypoints where off-road users are likely to enter a road from a driveway or parking area. For instance, rather than looking at observations of road users entering polygons, observations of road users that are exiting polygons representing driveways or parking areas may be used to determine frequencies, score waypoints, and train a model as discussed above. Knowing such off-road exit lane waypoints may better enable an autonomous vehicle's computing devices to predict that another road user who is currently off-road will enter the road at the off-road exit waypoint.

The features described herein may allow autonomous vehicles to make better behavior predictions for other vehicles which may be leaving a roadway, for instance, to enter an off-road area such as a parking area or driveway. For instance, by mapping entry points for off road areas, this may provide better context for predictions of what other vehicles are likely to do when near such entry points. This can result in more well-informed diving decisions and an increase in the overall safety of these autonomous vehicles.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method of identifying off-road entry lane waypoints, the method comprising:
   identifying, by one or more processors, from map information a polygon representative of a driveway or parking area;
   identifying, by the one or more processors, a nearest lane from the map information based on the polygon;
   identifying, by the one or more processors, a plurality of lane waypoints, each of the plurality of lane waypoints corresponding to a location within at least one lane;
   inputting, by the one or more processors, the polygon and the plurality of lane waypoints into a model;
   selecting, by the one or more processors, a lane waypoint of the plurality of lane waypoints as an off-road entry lane waypoint;
   associating, by the one or more processors, the off-road entry lane waypoint with the nearest lane; and
   providing, by the one or more processors, the association to an autonomous vehicle in order to allow the autonomous vehicle to use the association to control the autonomous vehicle in an autonomous driving mode.

2. The method of claim 1, wherein each of the plurality of lane waypoints includes a heading and identifying the plurality of lane waypoints includes identifying waypoints having headings that align with a heading of the nearest lane.

3. The method of claim 1, wherein the model is a machine learned model.

4. The method of claim 1, further comprising:
   using observations of actual road users entering a second polygon to identify a second lane waypoint;
   scoring the second lane waypoint; and
   training the model using the score.

5. The method of claim 4, wherein scoring the second lane waypoint is based on a number of observations having trajectories that pass through the second lane waypoint immediately before entering the second polygon.

6. The method of claim 4, wherein the training the model is further based on an angle difference between a heading of the second lane waypoint and a closest edge of the second polygon.

7. The method of claim 4, wherein the training the model is further based on a distance between the second lane waypoint and a center of the second polygon.

8. The method of claim 4, wherein the training the model is further based on a distance between the second lane waypoint and a center of the closest edge of the second polygon.

9. The method of claim 4, wherein the training the model is further based on a distance between the second lane waypoint and an end point of the closest edge of the second polygon.

10. The method of claim 9, wherein the end point is one of two end points of the closest edge of the second polygon that is closest to the second lane waypoint.

11. The method of claim 4, wherein the training the model is further based on an angle difference between the heading of the second lane waypoint and a heading of a line segment from the second lane waypoint to a center of the closest edge of the second polygon.

12. The method of claim 4, wherein the training the model is further based on a number of other lane waypoints that are closer to their respective closest edges of the second polygon.

13. The method of claim 4, wherein the training the model is further based on a number of other a number of other candidate lanes which are closer to their respective closest edges of the second polygon.

14. The method of claim 1, further comprising, generating a virtual lane between the off-road entry lane waypoint and the associated nearest edge of the polygon.

15. The method of claim 14, further comprising providing the virtual lane to an autonomous vehicle in order to allow the autonomous vehicle to use the virtual to make a prediction about behavior of another road user.

16. The method of claim 1, further comprising:
    identifying, by the one or more processors, a second nearest lane based on the polygon, the second nearest lane being an opposing lane of traffic to the nearest lane;
    identifying, by the one or more processors, a second plurality of lane waypoints;
    inputting, by the one or more processors, the polygon and the second plurality of lane waypoints into a second model;
    selecting, by the one or more processors, a lane waypoint of the plurality of lane waypoints as a second off-road entry lane waypoint;
    associating, by the one or more processors, the second off-road entry lane waypoint with the nearest lane as a second association; and
    providing, by the one or more processors, the second association to an autonomous vehicle in order to allow the autonomous vehicle to use the second association to control the autonomous vehicle in an autonomous driving mode.

17. A system for identifying off-road entry lane waypoints, the system comprising:
    one or more processors configured to:
        identify from map information a polygon representative of a driveway or parking area;
        identify a nearest lane based on the polygon;
        identify a plurality of lane waypoints, each of the plurality of lane waypoints corresponding to a location within at least one lane;
        input, the polygon and the plurality of lane waypoints into a model;
        select a lane waypoint of the plurality of lane waypoints as an off-road entry lane waypoint;
        associate the off-road entry lane waypoint with the nearest lane; and
        provide the association to an autonomous vehicle in order to allow the autonomous vehicle to use the association to control the autonomous vehicle in an autonomous driving mode.

18. The system of claim 17, wherein each of the plurality of lane waypoints includes a heading and identifying the plurality of laneway points includes identifying waypoints having headings that align with a heading of the nearest lane.

19. The system of claim 17, wherein the model is a machine learned model.

20. The system of claim 17, wherein the one or more processors are further configured to:
    using observations of actual road users entering a second polygon to identify a second lane waypoint;
    scoring the second lane waypoint; and
    training the model using the score.

\* \* \* \* \*